(12) United States Patent
Geisner et al.

(10) Patent No.: US 8,988,437 B2
(45) Date of Patent: Mar. 24, 2015

(54) CHAINING ANIMATIONS

(75) Inventors: Kevin Geisner, Seattle, WA (US); Relja Markovic, Seattle, WA (US); Stephen Gilchrist Latta, Seattle, WA (US); Gregory Nelson Snook, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 792 days.

(21) Appl. No.: 12/408,141

(22) Filed: Mar. 20, 2009

(65) Prior Publication Data

US 2010/0238182 A1 Sep. 23, 2010

(51) Int. Cl.
*G06T 13/00* (2011.01)

(52) U.S. Cl.
CPC ........................................ *G06T 13/00* (2013.01)
USPC .............................. 345/474; 345/473; 345/475

(58) Field of Classification Search
USPC ..................... 345/474, 473; 715/700; 382/103
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |

(Continued)

FOREIGN PATENT DOCUMENTS

| | | |
|---|---|---|
| CN | 1764931 A | 4/2006 |
| CN | 201254344 B | 6/2010 |

(Continued)

OTHER PUBLICATIONS

Lau et al., "Behavior Planning for Character Animation", Proceedings of the 2005 ACM SIGGRAPH/Eurographics symposium on Computer animation, Jul. 29-31, 2005, 10 pages.

(Continued)

*Primary Examiner* — Phi Hoang
(74) *Attorney, Agent, or Firm* — Sula Miia; Judy Yee; Micky Minhas

(57) ABSTRACT

In applications that display a representation of a user, it may be reasonable to insert a pre-canned animation rather than animating a user's captured motion. For example, in a tennis swing, the ball toss and take back in a serve could be a pre-canned animation, whereas the actual forward swing may be mapped from the user's gestures. An animation of a user's gestures can be chained together into sequences with pre-canned animations, where animation blending techniques can provide for a smoother transition between the animation types. Techniques for blending animations, that may comprise determining boundaries and transition points between pre-canned animations and animations based on captured motion, may improve animation efficiency. Gesture history, including joint position, velocity, and acceleration, can be used to determine user intent, seed parameters for subsequent animations and game control, and determine the subsequent gestures to initiate.

22 Claims, 10 Drawing Sheets

(56) References Cited

U.S. PATENT DOCUMENTS

| | | | |
|---|---|---|---|
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,880,731 | A | 3/1999 | Liles et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,057,909 | A | 5/2000 | Yahav et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,517 | A | 8/2000 | Yahav et al. |
| 6,100,896 | A | 8/2000 | Strohecker et al. |
| 6,101,289 | A | 8/2000 | Kellner |
| 6,115,052 | A | 9/2000 | Freeman et al. |
| 6,115,053 | A | 9/2000 | Perlin |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 * | 7/2001 | Takata et al. ................... 382/103 |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,317,132 | B1 | 11/2001 | Perlin |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,498,628 | B2 | 12/2002 | Iwamura |
| 6,502,515 | B2 | 1/2003 | Burckhardt et al. |
| 6,503,195 | B1 | 1/2003 | Keller et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,636,219 | B2 | 10/2003 | Merrick et al. |
| 6,640,202 | B1 | 10/2003 | Dietz et al. |
| 6,661,918 | B1 | 12/2003 | Gordon et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,771,277 | B2 | 8/2004 | Ohba |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,006,236 | B2 | 2/2006 | Tomasi et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,177 | B2 | 5/2006 | Tomasi et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,151,530 | B2 | 12/2006 | Roeber et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,224,384 | B1 | 5/2007 | Iddan et al. |
| 7,227,526 | B2 | 6/2007 | Hildreth et al. |
| 7,259,747 | B2 | 8/2007 | Bell |
| 7,293,356 | B2 | 11/2007 | Sohn et al. |
| 7,308,112 | B2 | 12/2007 | Fujimura et al. |
| 7,310,431 | B2 | 12/2007 | Gokturk et al. |
| 7,317,836 | B2 | 1/2008 | Fujimura et al. |
| 7,340,077 | B2 | 3/2008 | Gokturk et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,426,467 | B2 * | 9/2008 | Nashida et al. ................ 704/275 |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |

(56) References Cited

U.S. PATENT DOCUMENTS

| | | | |
|---|---|---|---|
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2002/0171647 A1 | 11/2002 | Sterchi et al. |
| 2003/0054327 A1 | 3/2003 | Evensen |
| 2003/0132938 A1 | 7/2003 | Shibao |
| 2004/0012594 A1* | 1/2004 | Gauthier et al. ............ 345/473 |
| 2004/0027352 A1 | 2/2004 | Minakuchi |
| 2004/0155962 A1 | 8/2004 | Marks |
| 2004/0207597 A1 | 10/2004 | Marks |
| 2005/0059488 A1 | 3/2005 | Larsen et al. |
| 2005/0071306 A1* | 3/2005 | Kruszewski et al. ........... 706/47 |
| 2005/0278157 A1* | 12/2005 | Raschke .......................... 703/6 |
| 2006/0106746 A1 | 5/2006 | Stuhec |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0206017 A1* | 9/2007 | Johnson et al. ............... 345/473 |
| 2007/0207846 A1* | 9/2007 | Burak et al. ...................... 463/9 |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0106746 A1 | 5/2008 | Shpunt et al. |
| 2008/0120558 A1 | 5/2008 | Nathan et al. |
| 2008/0126937 A1 | 5/2008 | Pachet |
| 2008/0134102 A1 | 6/2008 | Movold et al. |
| 2008/0215972 A1 | 9/2008 | Zalewski et al. |
| 2008/0215973 A1 | 9/2008 | Zalewski et al. |
| 2008/0273038 A1 | 11/2008 | Girard |
| 2008/0307304 A1* | 12/2008 | Feiler et al. .................... 715/700 |
| 2009/0167679 A1 | 7/2009 | Klier |
| 2009/0179901 A1* | 7/2009 | Girard .......................... 345/474 |
| 2009/0324017 A1* | 12/2009 | Gordon et al. ................. 382/103 |

FOREIGN PATENT DOCUMENTS

| | | | |
|---|---|---|---|
| EP | 0583061 A2 | 2/1994 |
| EP | 1645944 A1 | 4/2006 |
| JP | 08044490 A1 | 2/1996 |
| JP | 2000-011199 A | 1/2000 |
| JP | 2003-085592 A | 3/2003 |
| JP | 2007-325927 A | 12/2007 |
| JP | 2007-334443 A | 12/2007 |
| JP | 2008-015942 A | 1/2008 |
| JP | 2008-067866 A | 3/2008 |
| JP | 2008-099899 A | 5/2008 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 8/2001 |
| WO | WO 02/082249 A2 | 10/2002 |
| WO | WO 03/001722 A3 | 1/2003 |
| WO | WO 03/046706 A1 | 6/2003 |
| WO | WO 03/054683 A3 | 7/2003 |
| WO | WO 03/071410 A3 | 8/2003 |
| WO | WO 03/073359 A3 | 9/2003 |
| WO | 2006011763 A2 | 2/2006 |
| WO | WO 2006/117563 A2 | 11/2006 |
| WO | WO 2008/106197 A1 | 9/2008 |

OTHER PUBLICATIONS

PCT Application No. PCT/US2010/025919 : International Search Report and Written Opinion of the International Searching Authority, Sep. 29, 2010, 10 pages.

Macagon et al., "Efficient collision detection for skeletally animated models in interactive environments", Graphics Group, University of Auckland, Proceedings of IVCNZ'03, Massey University, Palmerston North, New Zealand, Nov. 26-28, 2003, 1-6.

Magnenat et al., "Interactive Virtual Humans in Real-Time Virtual Environments", The International Journal of Virtual Reality, Jun. 2006, 5(2), 15-24.

50 Magy, "Desktop 3-D Interactive Drama—Applying Design Principles from the Performance Arts.", Human Computer Interaction International, Jul. 21-27, 2005, 1-10.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

(56) References Cited

OTHER PUBLICATIONS

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"Decision on Rejection Received for Chinese Patent Application No. 201080013881.0", Mailed Date: Nov. 4, 2013, 8 Pages.

"Notice of Rejection Received for Japanese Patent Application No. 2012-500820", Mailed Date: Dec. 26, 2013, 10 Pages.

"Final Rejection Received for Japanese Patent Application No. 2012-500820", Mailed Date: Apr. 3, 2014, 4 Pages.

"Office Action Received for Russian Patent Application No. 2011138414", Mailed Date: Jan. 31, 2014, 4 Pages (w/o English Translation).

"Notice of Allowance Received for Russian Patent Application No. 2011138414", Mailed Date: Jun. 2, 2014, 22 pages.

\* cited by examiner

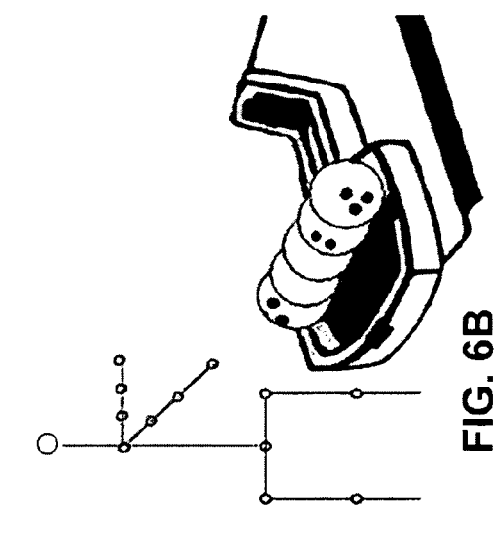
FIG. 6B
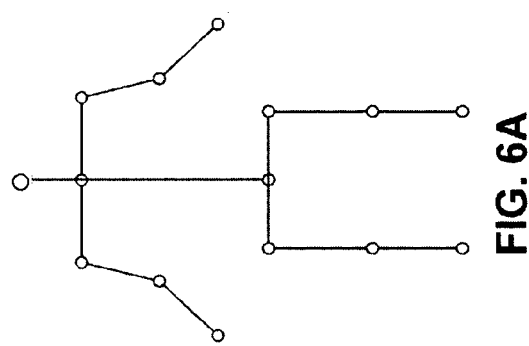
FIG. 6A
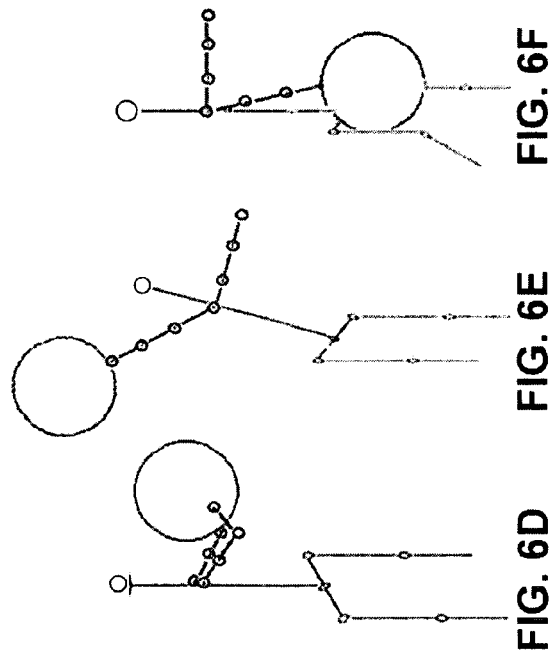
FIG. 6F
FIG. 6E
FIG. 6D
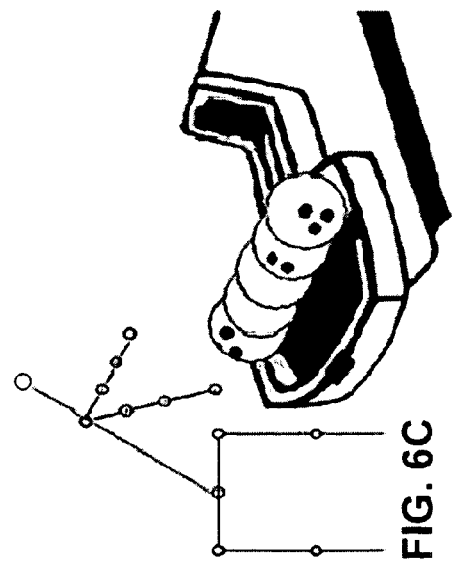
FIG. 6C

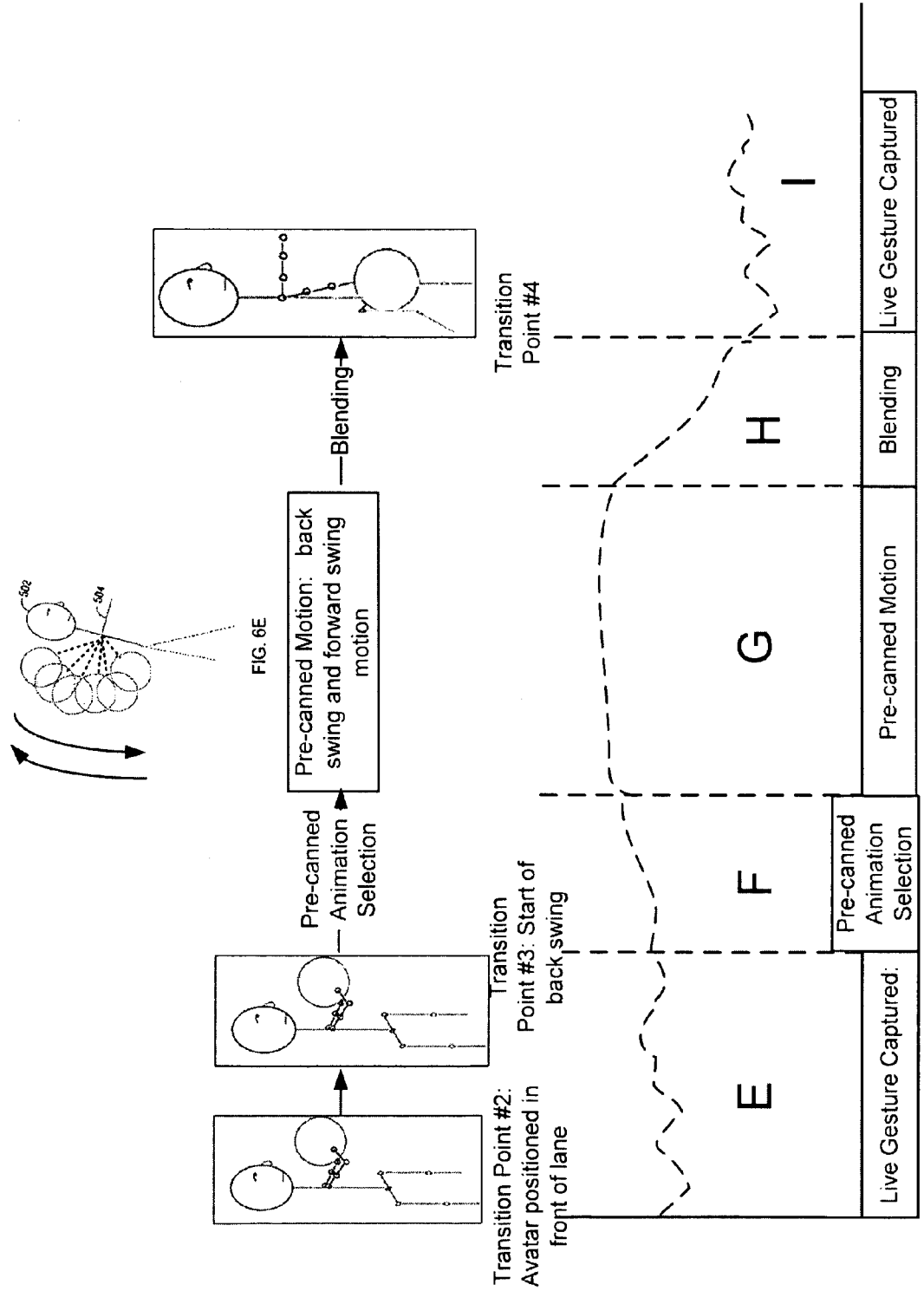

CHAINING ANIMATIONS

BACKGROUND

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

In some systems, a monitor may display user feedback that maps to user motions that have been captured by the system. For example, the user feedback may be displayed as an avatar on a screen, where that avatar's motion can be controlled by mapping the avatar's motion to the user's motions. Often, a user may make motions that are not necessary for the executing application. In some cases, user motions that are applicable to the particular application are redundant or very similar from user to user.

It may be useful in some scenarios to insert a pre-canned character animation rather than representing actual user motion. For example, in a tennis swing, the ball toss and take back in a serve could be a pre-canned animation, whereas the animation of the forward swing may map to user motion. Disclosed herein are techniques for determining boundaries and transition points for chaining pre-canned animations and animations that represent motion in the physical space, as well as techniques for blending the two types of animation. Such chaining and animation blending techniques may be desirable for animation efficiency purposes.

Chaining animations may comprise the selection of a pre-canned animation and transitioning between animations, such as from the pre-canned animation to an animation of the captured motion or from the animation of the captured motion to a pre-canned animation. For example, an animation of a user's gesture can be chained together sequentially with a pre-canned animation. Animation blending techniques can provide for a smoother transition between the animation of the gestures. Gesture history, including joint position, velocity, and acceleration, can be used to determine user intent, seed parameters for subsequent animations and game control, and determine the subsequent gestures to initiate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for a gesture recognizer system architecture in accordance with this specification are further described with reference to the accompanying drawings in which:

FIGS. 6A-6F illustrate example frames that capture a user's motions at various points in time, used for obtaining a depth image of user in a scene and parsing a gesture that user is making.

FIGS. 7A and 7B illustrate a sequence of user motions and an example embodiment of the implementation of chaining and animation blending techniques.

DETAILED DESCRIPTION OF ILLUSTRATIVE EMBODIMENTS

Figure 1A:
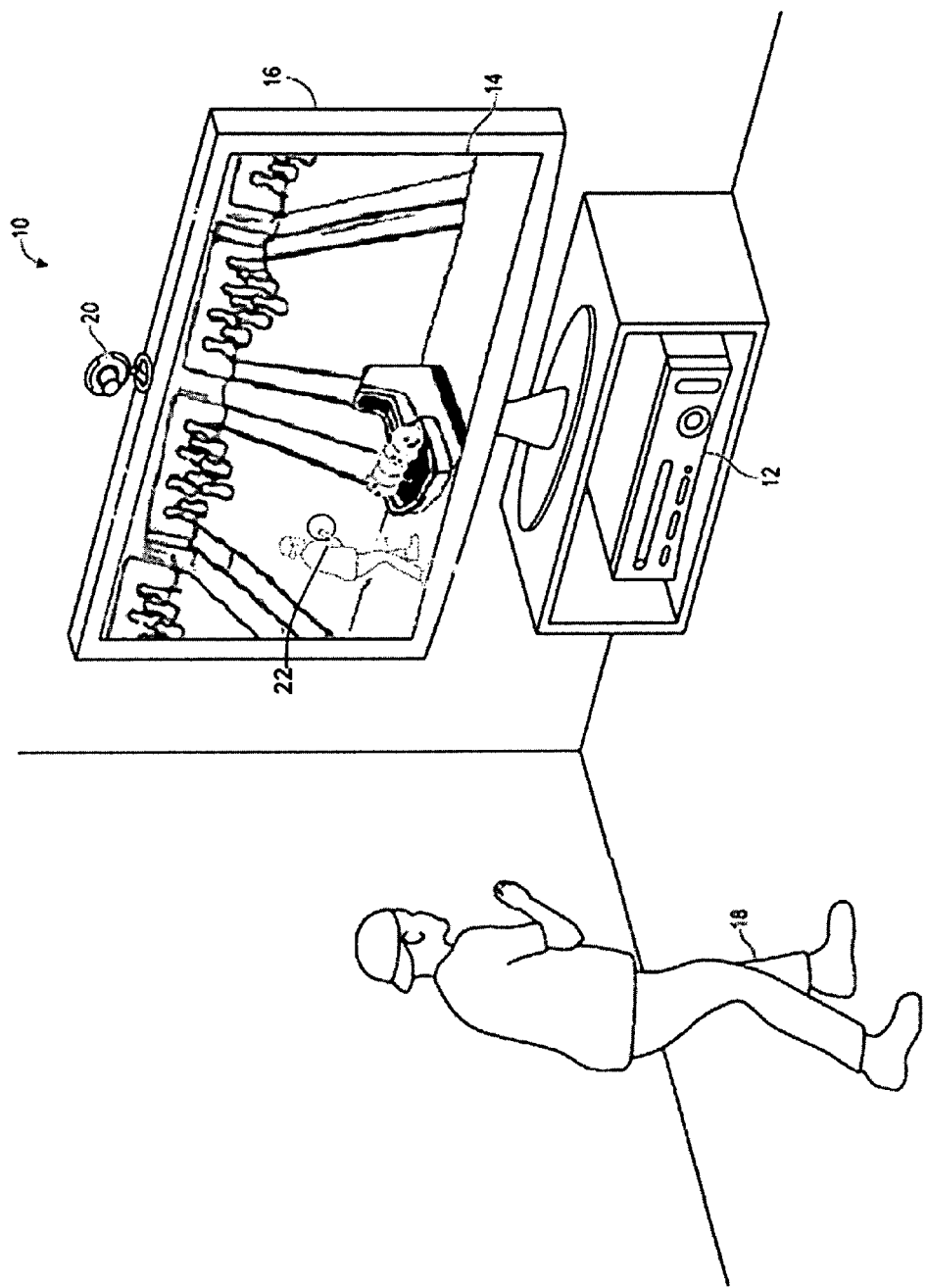
FIGS. 1A and 1B illustrate an example embodiment of a target recognition, analysis, and tracking system with a user playing a game.

A computing system can model and display a representation of a user such as in the form of an avatar. For example, a camera-controlled computer system may capture user image data and display user feedback that maps to a user's gestures. The user feedback may be displayed as an avatar on a screen, where that avatar's motion can be controlled directly by mapping the avatar's movement to the user's gestures. A gesture may be any user motion, such as running, moving a finger, or a static pose. The animation of the user's captured motion or the user's gesture can be driven by the capture device input.

It may be desirable in some situations to use a pre-canned animation for visually representing captured motion, rather than mapping to the actual captured motion. The captured motion may be any motion in the physical space that is captured by the capture device, such as a camera. The captured motion could include the motion of a target in the physical space, such as a user or an object. The captured motion may include a gesture that translates to a control in an operating system or application. The motion may be dynamic, such as a running motion, or the motion may be static, such as a user that is posed with little movement.

The pre-canned animation can be a predetermined character animation or a pre-recorded gesture. It may be desirable in some scenarios to insert a pre-canned animation rather than representing actual target or user motion. For example, in a tennis swing, it may be desirable to use predetermined motion to represent the gestures of a ball toss and take back in a serve by inserting a pre-canned animation. Following the serve, it may be desirable to return to the use of the user's captured motion, e.g., return to a mapping of the user's motion for the actual forward swing.

Disclosed herein are techniques for chaining animation types, including determining boundaries and transition points between animations driven by different drivers (e.g. a pre-canned animation and an animation driven by camera input). The animation types may be chained via any suitable method. The method for chaining may depend on the level of smoothing that is desired between the chained animations. For example, the computing system may insert as many pre-canned animations into the chained animation sequence as necessary to make the transition between the animation of the user's captured motion and the pre-canned animation more of a seamless transition. In another example, the computing system may analyze the parameters of the user's captured motion at the transition point and modify the pre-canned animation to more closely represent the user's captured motion at that point. The animations may be similar enough at the transition point that the animations may be chained together simply by displaying the animations in sequence. In another example, animation blending techniques may be employed to provide a very smooth transition between various animation types.

As used herein and in the claims, references to blending or chaining between an animation of live motion and a pre-canned animation includes both chaining or blending from the animation of the captured gesture to the pre-canned animation and, vice versa, chaining or blending from the pre-canned animation to the animation of the captured gesture. Furthermore, any combination of chaining techniques may be employed, alone or in combination. For example, the computing system may modify a pre-canned animation prior to chaining, and animation blending techniques may also be employed to smooth the transition between the animation of captured motion and the modified pre-canned animation.

The system, methods, and components of chaining described herein may be embodied in a multi-media console, such as a gaming console, or in any other computing device in which it is desired to blend user input with pre-canned data including, by way of example and without any intended limitation, satellite receivers, set top boxes, arcade games, personal computers (PCs), portable telephones, personal digital assistants (PDAs), and other hand-held devices.

Figure 1B:
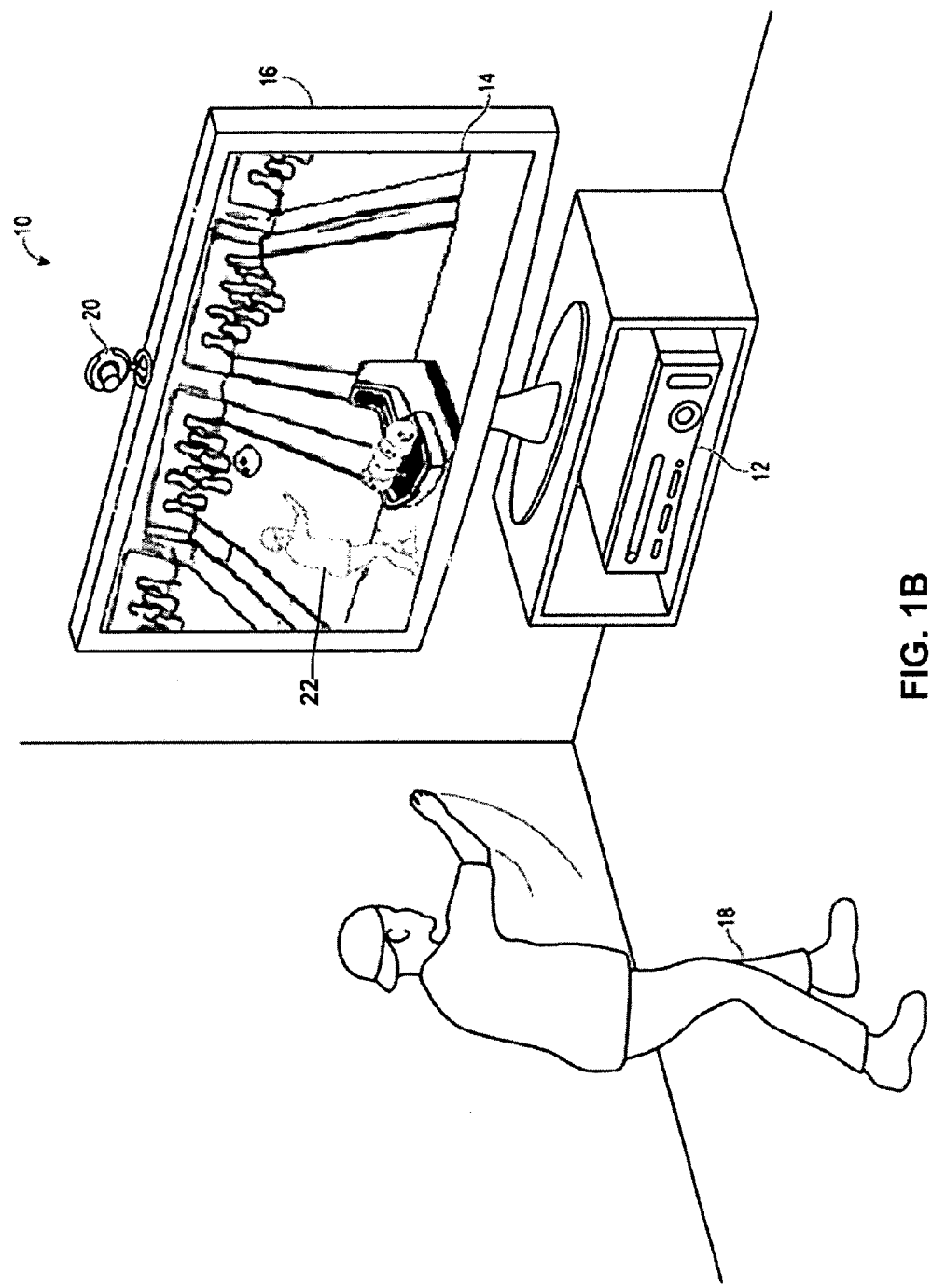

FIGS. 1A and 1B illustrates an example embodiment of a configuration of a camera-controlled target recognition, analysis, and tracking system 10 that can utilize chaining and animation blending techniques. The system depicts a user 18 playing a bowling game. In an example embodiment, the system 10 may recognize, analyze, and/or track a human target such as the user 18. The target recognition, analysis, and tracking system 10 may gather information related to the user's movements in the physical space. The system 10 may store information related to pre-canned animations. At certain points throughout the user's 18 bowling motion, rather than track, analyze, and map to a display an animation that represents the user's 18 actual motion or gestures, it may be desirable to insert pre-canned animations to represent portions of the bowling motion.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

The system 10 may translate an input to a capture device 20 into an animation, the input being representative of a user's motion, such that the animation is driven by that input. Thus, the user's motions may map to an avatar such that the user's motions in the physical space are performed by the avatar. The user's motions may be gestures that are applicable to a control in an application. For example, FIGS. 1A and 1B each depict an example embodiment of an application executing on the computing environment 12 that may be a bowling game that the user 18 may be playing. The computing environment 12 may use the audiovisual device 16 to provide a visual representation of a bowling alley and bowling lanes to the user 18. The computing environment 12 may also use the audiovisual device 16 to provide a visual representation of a player avatar 22 that the user 18 may control with his or her movements. According to an example embodiment, the computer environment 12 and the capture device 20 of the target recognition, analysis, and tracking system 10 may be used to recognize and analyze the gestures made by the user 18 in the user's three-dimensional physical space such that the user's gestures may be interpreted to control the player avatar 24 in game space. For example, as shown in FIG. 1B, the user 18 may make a bowling motion in a physical space to cause the player avatar 24 to make a bowling motion in the game space. Other movements by the user 18 may also be interpreted as controls or actions, such as controls to walk, select a ball, position the avatar on the bowling lane, swing the ball, etc.

The system 10 may insert pre-canned animations rather than using an animation of the actual motion or captured gesture of the user 18. For example, certain segments of game control may be represented by a pre-canned animation. In the bowling game example above, for example, picking up the bowling ball or walking towards the lane could be portions of a bowling motion that are represented by pre-canned animations.

A user's gestures or motion may be interpreted as controls that may correspond to actions other than controlling the player avatar 24. For example, the player may use movements to end, pause, or save a game, select a level, view high scores, communicate with a friend, etc. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

It may be desirable to insert a pre-canned animation for representing other controls, such as the user's motion for tab/blade selection. In the user interface example above, for example, the system may interpret a user's gesture as selecting or moving a blade or tab and insert a pre-canned animation for display purposes, rather than mapping the user's captured gesture to an animation. For example, for transitioning between the tabs, it may be desirable to insert a pre-canned animation with a scripted transition speed for movement of the tab, rather than moving the tab in a speed that maps to the user's actual hand motion. Thus, the system may capture and interpret the user's gesture as the selection and movement of a tab, but transition to a pre-canned motion once a threshold speed of the user's hand, indicating the desire to switch between tabs, is detected. Blending the animations between a pre-canned animation and that which represents live motion may provide more efficient animation. Thus, the system may switch between mapping the user's actual motion or captured gesture for animation to, instead, displaying and implementing a pre-canned animation.

Some player movements may be interpreted and identified as having parameters that are indicative of a transition point. A transition point may be the point at which the system 10 transitions between the animation of a user's captured motion or gesture and a pre-canned animation. In an example embodiment, the transition point may be an identifying point in a captured gesture of a user that prompts the system to transition to a pre-canned animation. In another example embodiment, a transition point is the identifying point in a pre-canned animation that triggers the system to return to the use of the user's captured gestures.

Thus, the identification of a transition point can trigger the system's transition between representing a user's motion and representing a pre-canned animation. For example, the player 18 may make a clutching motion which the system 10 may interpret as a control for the selection of a bowling ball. The interpretation of the clutching motion may trigger the system's transition from a display of the user's captured gestures at the point of ball selection to the display of a pre-canned animation for the motion that follows ball selection, e.g., stepping up to the bowling lane.

Any suitable method for setting transition points may be employed. The application itself could set the transition points based on the type of application or the skill level or experience of the user. For example, more pre-canned animations may be implemented for a beginning player of a game such that more difficult gestures for success are pre-canned. A user could set the transition points so that pre-canned animations are used for particular motions, or the user could request more or less use of pre-canned animations during the execution of an application.

In the example embodiment shown in FIG. 1B, the object is a bowling ball and the user moves in the three-dimensional physical space as if actually handling the bowling ball. The user's gestures in the physical space can control the bowling ball displayed on the screen 14. In example embodiments, the human target, such as the user 18, may actually be holding an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may interpret target movements for controlling aspects of an operating system and/or application that are outside the realm of games. For example, virtually any controllable aspect of an operating system and/or application may be controlled by movements of the target such as the user 18.

Figure 2:
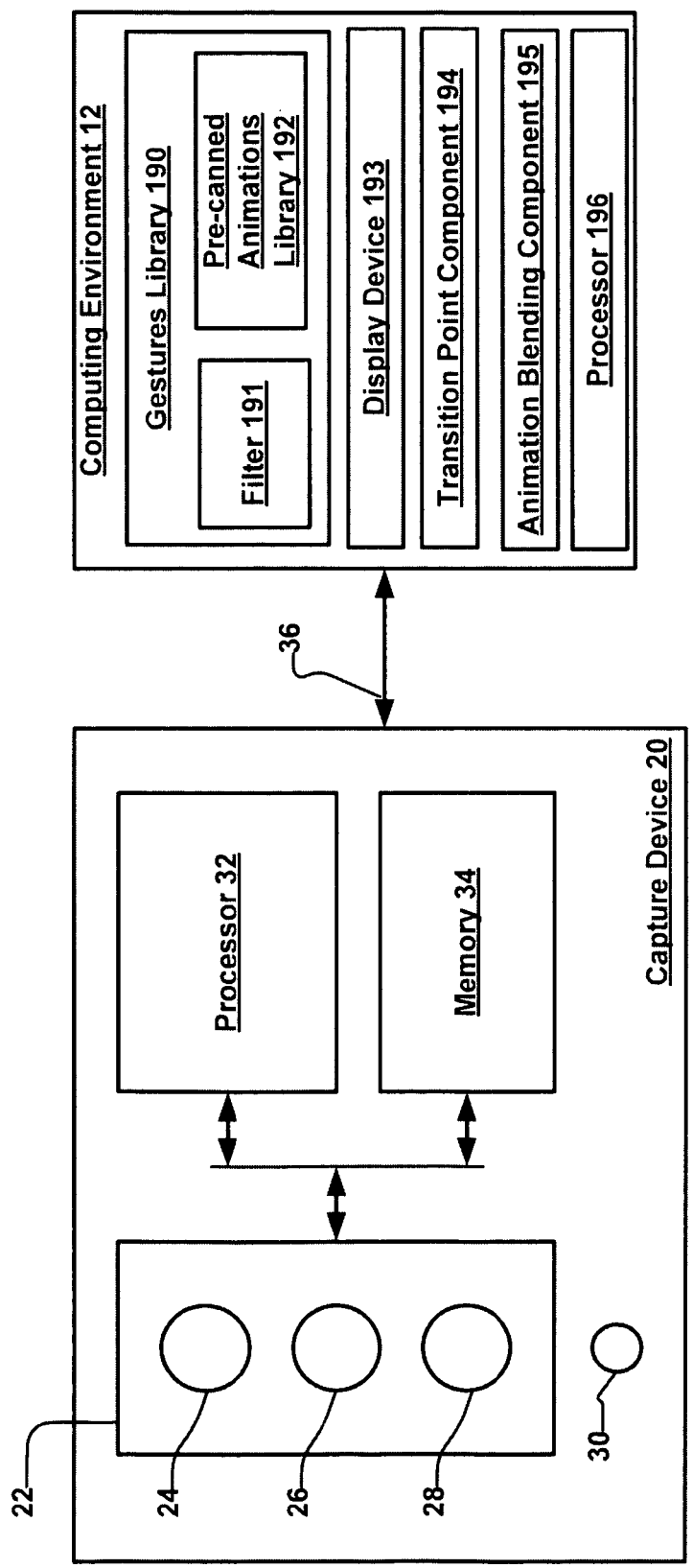
FIG. 2 illustrates an example embodiment of a capture device that may be used in a target recognition, analysis, and tracking system and incorporate chaining and animation blending techniques.

FIG. 2 illustrates an example embodiment of a capture device 20 that may be used for target recognition, analysis, and tracking, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 190.

The gestures library 190 may include a collection of gesture filters 191. Each filter 191 may comprise information defining a gesture along with parameters, or metadata, for that gesture. For instance, a throw, which comprises motion of one of the hands from behind the rear of the body to past the front of the body, may be implemented as a gesture filter comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

The data captured by the cameras 26, 28 and device 20 in the form of the skeletal model and movements associated with it may be compared to the gesture filters 191 in the gesture library 190 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 12 may include a processor 196 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints is identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20 itself, and the raw image data of depth and color (where the capture device comprises a 3D camera) values are transmitted to the computing environment 12 via link 36. In another embodiment, the processing is performed by a processor 32 coupled to the camera 402 and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

The computing environment 12 may use the gestures library 190 to interpret movements of the skeletal model and to control an application based on the movements. The computing environment 12 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIGS. 1A and 1B. The avatar's motion can be controlled directly by mapping the avatar's movement to those of the user's movements. The user's gestures may control certain aspects of the application.

It may be desirable to use a pre-canned animation rather than displaying a representation of the user's motion. A user's gesture may not always be applicable to an application. For example, during access of an application via the computing environment, a user may reach for a drink. In a virtual world application, common user motions such as reaching for a drink or shifting in a chair may be desirable to map to the displayed motion. In other applications, such as entering information into a spreadsheet, it may not be desirable to display certain captured motions of the user such as reaching for a drink. In some cases, user motions that are applicable to the particular application are redundant or very similar from user to user. For example, the backswing of a bowling motion may be common and it may not be necessary to capture and model the user's captured backswing motion. In other cases, certain user motions are more difficult to capture or inexperienced users may have difficulty properly making the motion. For example, a proper backswing may be a difficult motion for a young child and using a pre-canned motion for that portion of the bowling motion may be desirable. The user's motion, even when not directly mapped to an animation, may still be interpreted for control in an application. Alternately, the pre-canned animation may provide control during all or a portion of the period for which it is displayed.

The gestures library 190 may include a pre-canned animations library 192 comprising animation data that is predetermined or pre-recorded. The computing environment may implement pre-canned data to represent certain motions, such as a particular a gesture, from the pre-canned animations library 192. The pre-canned animation may be used to represent a user's motion, rather than displaying a visual representing that maps directly to the user's captured motion The pre-canned animations library 192 may comprise a variety of pre-canned animations. The animations may be applicable to a particular application, to a particular gesture, to a particular motion, to a skill level, or the like.

The pre-canned animation may be chained at a transition point to an animation of a captured motion, or the animation of the captured motion may be chained at a transition point to the pre-canned animation. In both scenarios, the selection of the pre-canned animation to be chained to the animation of captured motion may depend on various factors, such as parameters of the user, of the type of application, parameters of the pre-canned animation, a user skill level, a level of difficulty of performing a gesture, a redundancy of gestures, etc.

Many pre-canned animations may represent the same desired motion, and the computing environment may choose a pre-canned animation from the plurality that is most suitable. For example, a plurality pre-canned animation options may be available to represent the backswing of a tennis serve. The position and velocity parameters of the backswing motion may vary for each of the plurality of pre-canned animations that represent the backswing. Several examples of a plurality of pre-canned animation options based on different factors are described.

In an example embodiment, the selection of a particular pre-canned animation to chain to an animation of the captured motion may depend on a comparison of parameters of the pre-canned animation parameters to parameters of the animation of captured motion at the point of transition. For example, there may be five pre-canned animation options that represent the backswing motion. Up to and at the transition point, the capture device may receive the image data of the user's motion. The image data may be parsed to identify the position of the user to and at the transition point, and, this example, the system identifies a very slow velocity of the user's arm throughout the user's tennis motion. The selection of the pre-canned animation for the backswing motion, out of the five pre-canned animation options, may be based on the animation with position and velocity parameters that are closest to those of the user's motion. Similarly, when returning from a pre-canned animation to an animation of captured motion, the image data captured by the capture device may be parsed to identify motion in the physical space.

The parameters of a pre-canned animation may be modified to more closely relate to the motion captured by the capture device. An analysis of the image data may prompt the transition to a different pre-canned animation, to modify the animation of the executing pre-canned animation, or blend multiple pre-canned animations. For example, one of a plurality of pre-canned animations may be selected for chaining to the animation of the captured motion. The parameters may be modified to more closely correspond to physical features of the user, or motions that a user tends to make.

In another example embodiment, the selection of a pre-canned animation may actually be a selection of two or more pre-canned animations that are combined in some manner. For example, two or more pre-canned animations may have parameters that are desired for chaining to an animation of captured motion. Parameters from the multiple pre-canned animations may be combined to generate a new, more suitable pre-canned animation for chaining to the animation of the captured motion. In an example embodiment, the computing environment may use the animation blending component 195 to generate a new pre-canned animation, where the inputs are the multiple pre-canned animations. The new pre-canned animation may be a better representation of the user's captured motion at the transition point and therefore provide a smoother transition between animations when they are chained together. Thus, in the tennis example above, two or more pre-canned animations that represent a backswing in a tennis serve may be combined in some matter, such as blended, to provide a new pre-canned animation that is tailored to the position and velocity of the user.

In another example embodiment, the selection of a particular pre-canned animation to chain to an animation of the captured motion may be based on parameters of the user. For example, the capture device may receive image data of a user playing a game. The image data may be parsed to determine various parameters about the user and the user's motion. The image data may indicate a height of the user as well as the motion of the user's joints for a particular motion. The user's joint positions throughout the motion and the motion of the user's joints and limbs captured at a point of transition may be identified. The pre-canned animation may be selected that corresponds to an animation that will represent a similar height of the user and moves in a similar manner to the user's motions captured by the captured device.

In another example embodiment, the selection of a particular pre-canned animation to chain to an animation of the captured motion may be based on a skill level of a user. For example, if an inexperienced user is playing a tennis game, it may be desirable that the motion of an animated arm swing in the backswing of a serve be much slower and basic. Thus, a selection of basic pre-canned animations tailored to an inexperienced user may be suitable. On the other hand, a more experienced user may put a spin on the ball, have better racquet control or aim, or have a faster backswing. More options for pre-canned animations may be offered based on the more advanced skill level such that a spin on the ball or an aim can be accounted for in the backswing motion.

While specific examples for a selection from a plurality of pre-canned animations are provided, it is contemplated that the selection can be based on any combination of parameters. For example, the selection from a plurality of pre-canned animations could be based on both a user skill level and a user height captured by the capture device. The selection of the pre-canned animation may change in the middle of execution, transitioning the executing pre-canned animation to a new one, an animation based on multiple blended pre-canned animations, a modified pre-canned animation, or the like.

The pre-canned animation may also modified before being chained to the animation of captured motion. In some cases, the pre-canned animation may be modified to such a point that little or no smoothing is required to chain the pre-canned animation and the animation of captured motion. For example, parameters of the user's captured motion may be analyzed, and a pre-canned animation may be selected for chaining. Prior to chaining, the pre-canned animation may be modified to more closely represent the user's captured motion at the transition point. For example, the position of an arm in the animation may be modified to more closely represent that of the user's captured motion.

Modifying certain parameters of the pre-canned animation in such a manner can sometimes eliminate the need for any smoothing techniques for a seamless transition between animation types. The parameters may be modified during execution, tailoring the parameters of the pre-canned animation to the user's motion during runtime as the motion is captured. Alternately, the parameters may be modified based on history data of a user. For example, if a pre-canned animation is inserted for a user's backswing motion in a tennis serve, history data of the user's position may indicate a typical position of the user's elbow at the transition point between the pre-canned animation and the animation of the user's captured motion. Because a user will often perform routine or common motions in a similar manner each time, in a way that is particular to that user, the parameters of the pre-canned animations can be modified based on history data for that user. Similarly, a user may slowly improve gestures for control in the application and the history data can track the changes in the user's captured motion and modify the pre-canned animation parameters accordingly.

The computing environment 12 may include a transition point component 194 and an animation blending component 200. The transition point component 198 may determine when it is appropriate to use a pre-canned animation and when it is appropriate to provide an animation that corresponds to the user's captured motion. Depending on various factors, such as the type of application, user skill level, level of difficulty of performing a gesture, redundancy of gestures, etc, the transition point module 198 can identify or set transition points where the represented motion may transition between an animation that corresponds to a user's motion and a pre-canned animation.

The gestures library 190, transition point component 194 and animation blending component 200 may be implemented in hardware, software or a combination of both. For example, the gestures library 190, transition point component 194 and animation blending component 200 may be implemented as software that executes on a processor, such as processor 196, of the computing environment (or on processing unit 101 of FIG. 3 or processing unit 259 of FIG. 4).

Figure 3:
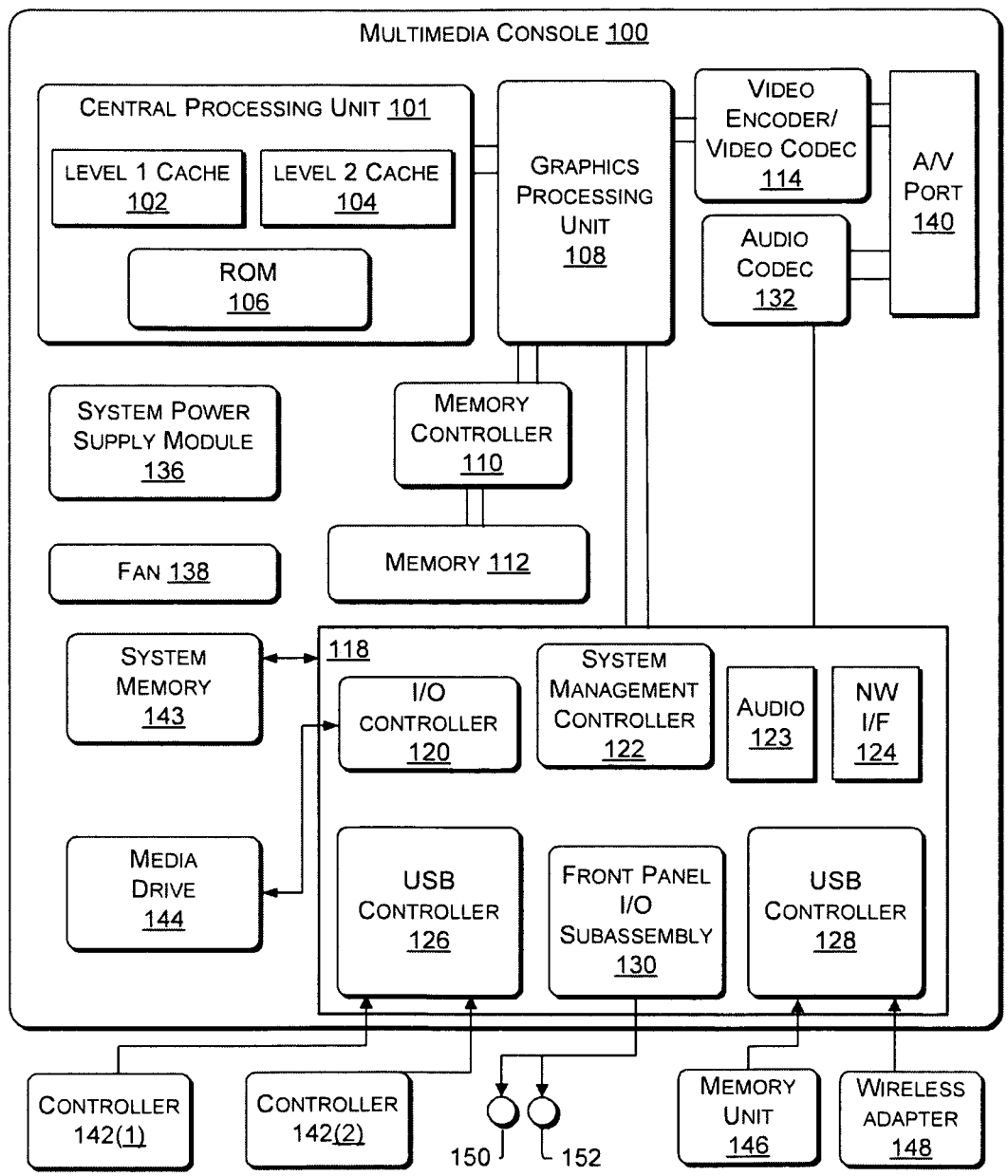
FIG. 3 illustrates an example embodiment of a computing environment in which the animation techniques described herein may be embodied.
Figure 4:
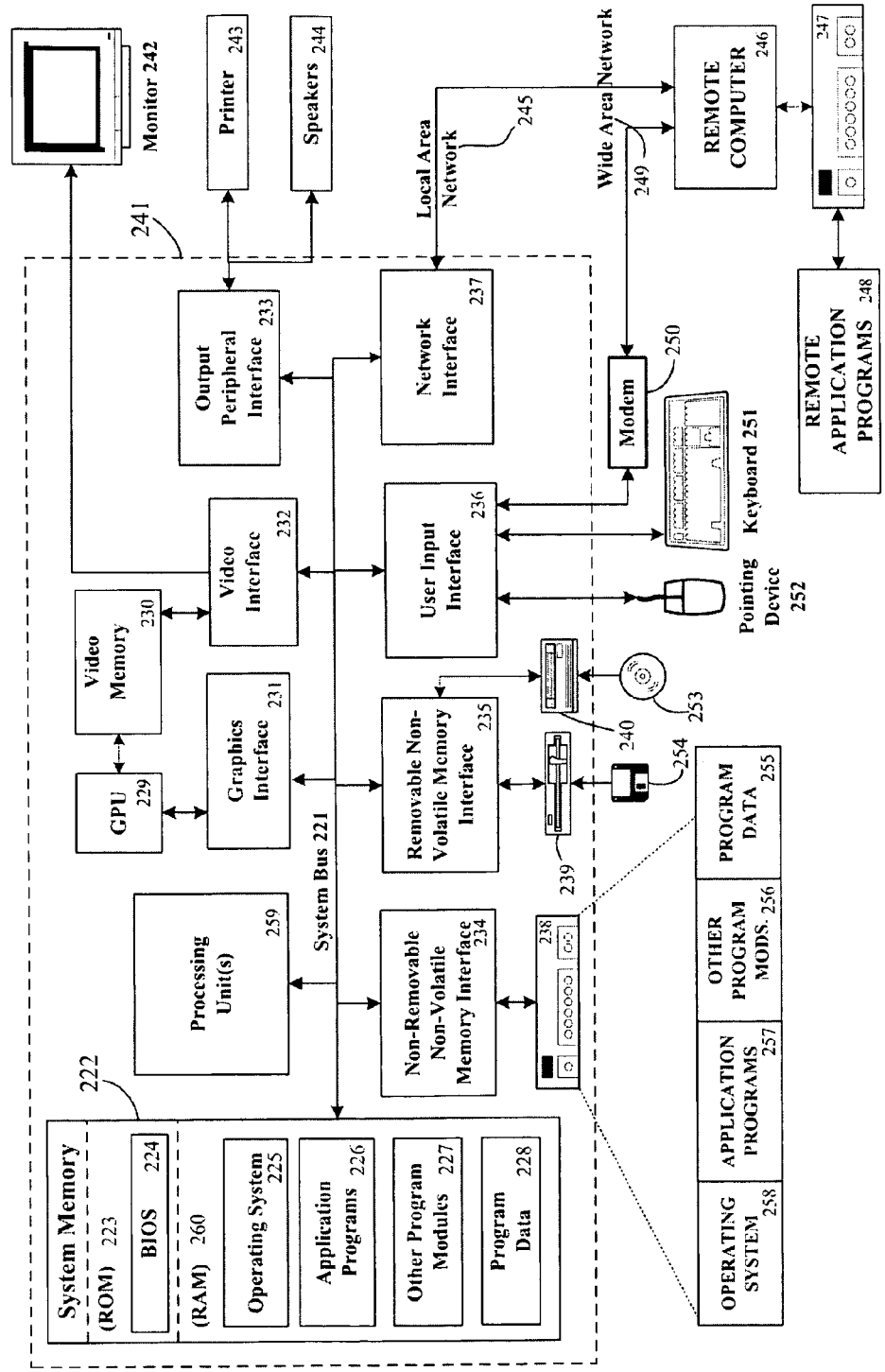
FIG. 4 illustrates another example embodiment of a computing environment in which the animation techniques described herein may be embodied.

It is emphasized that the block diagram depicted in FIGS. 2-4 are exemplary and not intended to imply a specific implementation. Thus, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 190 may be implemented as software that executes on the processor 32 of the capture device or it may be implemented as software that executes on the processor 195 in the computing environment. Any combination of processors that are suitable for performing the techniques disclosed herein are contemplated. Multiple processors can communicate wirelessly, via hard wire, or a combination thereof.

The gestures library and parameters that identify transition points may be tuned for an application or a context of an application by a gesture tool. A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a first with the fingers towards the ground and extending the first in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

Gestures, pre-canned animations, and transition points may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture, a pre-canned animation, or a transition point to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first person shooter, action, driving, and sports.

The transition point component 198 can determine when it is appropriate to use a pre-canned animation and when it is appropriate to provide an animation based on the user's captured motion or gesture. The transition point component 194 may analyze a user's motion to determine if any related parameters meet those that are indicative of a transition point. For example, the various gestures for a bowling motion in a bowling application may be interpreted by the computing environment 12. The gesture filter 191 may identify the start of a user's backswing based on parameters that match that of a backswing gesture.

A transition point in the bowling motion could be set at the point where the user's hand crosses the plane of his or her hip. A characteristic of the transition point may be that the user's captured motion comprises a backswing motion and occurs at a certain velocity. The parameters measured from a user's gesture in the physical space may match the parameters of a transition point. The identification of a transition point can trigger the implementation of a pre-canned or predetermined gesture. The pre-canned animations library 192 can store the pre-canned backswing animation.

The animation blending component 195 may smooth the transition between the live animation and the pre-canned animation. For example, the computing environment 12 may generate a skeletal mapping of the user's movements and smooth the transition of the user's position measured at the transition point to that of the initial position of the pre-canned animation. Chaining the user's motion and the pre-canned animation in this manner can minimize any disruption to the displayed representation of the user, potentially providing a seamless transition. Captured motion will vary between users and may vary each time a user performs a particular gesture. Thus, the blending for various users and various motions, chained with a predetermined motion, may also vary. The pre-canned animation selected for chaining can also determine the amount of blending that will be required.

A second transition point may be set when the user's hand crosses the plane of his or her hip when bringing the ball forward again. The second transition point may trigger the return to the use of an animation that corresponds to the user's captured motion or gesture. Again, the animation blending component 195 may smooth the transition between the an animation of the user's motion and the pre-canned animation.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
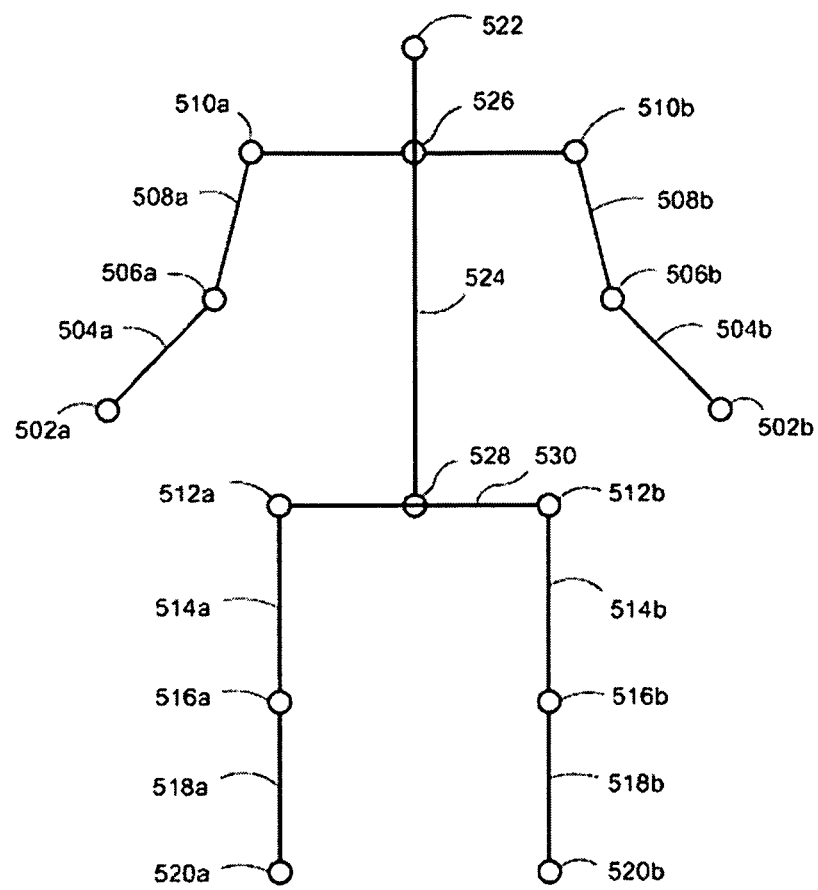
FIG. 5 illustrates a skeletal mapping of a user that has been generated from a depth image.

FIG. 5A depicts an example skeletal mapping of a user that may be generated from the capture device 20. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and braking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510a, and on the same side of the head 522 as the throwing arm 502a-310a. It may not be necessary to define all bounds of a volume, such as with this throwing gesture, where an outer bound away from the body is left undefined, and the volume extends out indefinitely, or to the edge of scene that is being monitored.

FIGS. 6A-6F depict an example of gestures that a user 602 may make during a bowling game. Each of FIGS. 6A-6F may correspond to a snapshot or frame of image data of the user's motion at different points in time. Each frame of image data may be parsed to produce a skeletal map of the user and gestures may be identified as described in relation to the skeletal map shown in FIG. 6. The frames, or snapshots, of image data shown in FIGS. 6A-6F may be captured by a capture device and processed by the capture device 20 or in a computing environment 12, as shown in FIG. 2.

A capture device 20 may capture consecutive frames of image data more rapidly than the user may cover the distance. For instance, the bowling gestures may occur over a period of 10 seconds, and where a depth camera captures data at 40 frames per second, it would capture 400 frames of image data. The system, having produced a skeletal map from the depth image of the user, may now determine how that user's body moves over time, and from that, parse the gesture. At different points in user motion, the system may implement pre-canned animation for display rather than displaying an animation that represents the user's motion.

In FIG. 6A, the user 602 begins with the arms 604 down at his sides. The user walks to the bowling ball return, shown by the snapshot of the user's motion in FIG. 6B. The user then selects a ball as shown by the snapshot of the user's motion in FIG. 6C. The user may be reaching for an actual physical object in the user's physical space that is identified by the capture device and can be displayed in relation to an avatar in the game space. Alternately, the props or objects used in a particular application may be displayed on the screen and the user can interact with the objects by positioning himself properly in the physical space to correspond to a location in the game space. For example, if a collection of balls in a bowling ball return were displayed in the game space, a user could make a forward walking motion and turn in the physical space to control the avatar's walking and turning towards the bowling ball return displayed in the game space. By watching the displayed representation of the user, such as an avatar that is mapped to the user's gestures, the user can position himself or herself to make a ball selection.

Once a ball is selected, the user walks to a location on the bowling lane between the frames shown in FIG. 6C and FIG. 6D, and positions himself or herself in the desired location. Again, by observing the user's motion mapped to a display, the user can make a walking motion in the user's physical space to move the avatar to the proper position on the bowling lane displayed in the game space. The user holds a ball to prepare for a backswing motion, shown by the snapshot of the user's motion in FIG. 6D, and begins the backswing motion, shown by the snapshot of the user's motion in FIG. 6E. FIG. 6F depicts the user at the point of release of the bowling ball down the bowling lane.

While a capture device 20 captures a series of still images, such that in any one image the user appears to be stationary, the user may be moving in the course of performing this gesture (as opposed to a stationary gesture). The system is able to take this series of poses in each still image, and from that determine the confidence level of the moving gesture that the user is making.

In performing the gesture, the user's motions may be mapped to a representation on a display, such as an avatar. It may be appropriate to insert a pre-canned animation instead of mapping an animation that corresponds to the user's captured motion. If the user's motion is not a gesture that controls an aspect of the application, it may still be desirable to display the user's motion or insert a pre-canned animation. For example, following the user's ball selection in FIG. 6C, the motion between the frames shown in FIG. 6C and FIG. 6D that involves bending back upwards and moving to face the bowling pins may be better represented by a pre-canned animation. Rather than mapping the user's captured motion, it may be more efficient for animation purposes to use a pre-canned animation. As another example, the user's backswing which occurs between the images depicted in FIGS. 6D and 6F, a snapshot of which is shown in FIG. 6E, may be complicated for inexperienced users or it may be set for pre-canned animation because it is such a common motion for a bowling game.

A particular gesture or segment of motion may be selected to be represented by a pre-canned animation for a variety of reasons. For example, the motion may be insignificant to the user's performance in the game and the use of a pre-canned animation may be more efficient than mapping the animation to the user's motions. The insertion of a pre-canned animation for animation purposes may be desirable for common motions or those that are complicated to measure or identify. It may be desirable to use pre-canned animations in situations that a user would not expect his or her motion to be mapped to the display. Some motions applicable to the application are so common that a user cannot distinguish the use of a pre-canned animation from the display of an animation based on the user's captured motion or gesture, and it may be more efficient to display one or the other. The pre-canned animation may be desirable to provide break points in a game or application. For example, if the user is aware that a pre-canned animation will move the user's avatar from the bowling ball return to the lane after ball selection, the user can take a break before resuming the game without affecting the avatar's motion. Then, the user can gesture a triggering motion to trigger the return of the system to displaying the user's motion.

The transition points that trigger the use of pre-canned animations and the type and amount of blending required may be tuned by parameters associated with the gesture to best serve the specifics of the application. For instance, in a bowling application that utilizes a gestures library having related gesture information, the user's motions shown in FIGS. 6A-6F may be identified as bowing gestures. Parameters related to the gesture or specific to the application may identify a transition point, triggering the use of a pre-canned animation for a segment of the animation that follows the transition point.

A set of parameters for identifying a transition point may be more strict, such as requiring a user to bend within a certain angle or to make a specific motion. For example, a transition point may be identified by an application-specific motion, such as the transition point in the bowling motion described above that requires the user to make a clutching motion with an outstretched when the user's avatar is positioned over the desired bowling ball. If a transition point is identified by a combination of parameters, the combination of parameters may increase the confidence level in the indication of the transition point. For example, consider a bowling application where the motion between FIGS. 6C and 6D is to be represented by a pre-canned animation. The parameters indicative of the transition point may require a combination of the type of application (e.g., a bowling game), a certain user motion (e.g., bending down), and an application-specific motion (e.g., clutching motion for ball selection).

Transition points may vary between applications. The satisfaction of parameters in one application may be indicative of a transition point, but satisfying those same parameters in a second application may not be indicative of a transition point. The clutching motion in that particular point in the game may identify the transition point, where a pre-canned animation will represent the user's motion until the next transition point. In another application, such as a non-gaming spreadsheet application, a clutching motion may be used to move information from one cell in the spreadsheet to another cell. The parameters for a transition point may require that the user move through particular positions within a specified period of time, such as 1.5 seconds, and if the user takes more than 1.5 seconds to move through these positions, it will not be recognized as the particular transition point, thereby not triggering a pre-canned animation.

The system may measure the user's gestures in the physical space to the movement of an avatar towards the bowling ball return, bending down and then making a clutching motion for a particular ball. At the point of transition, the system may implement a pre-canned animation for the motion following the ball selection (e.g., the motion of bending back up and positioning the avatar properly on the bowling lane facing the bowling pins). The system may employ techniques for animation blending such that the transition from an animation that corresponds to a user's live motion to a pre-canned animation, or vice versa (from the pre-canned animation to an animation that corresponds to the user's motion) can be chained together with minimal disruption to the display.

Figure 7A:
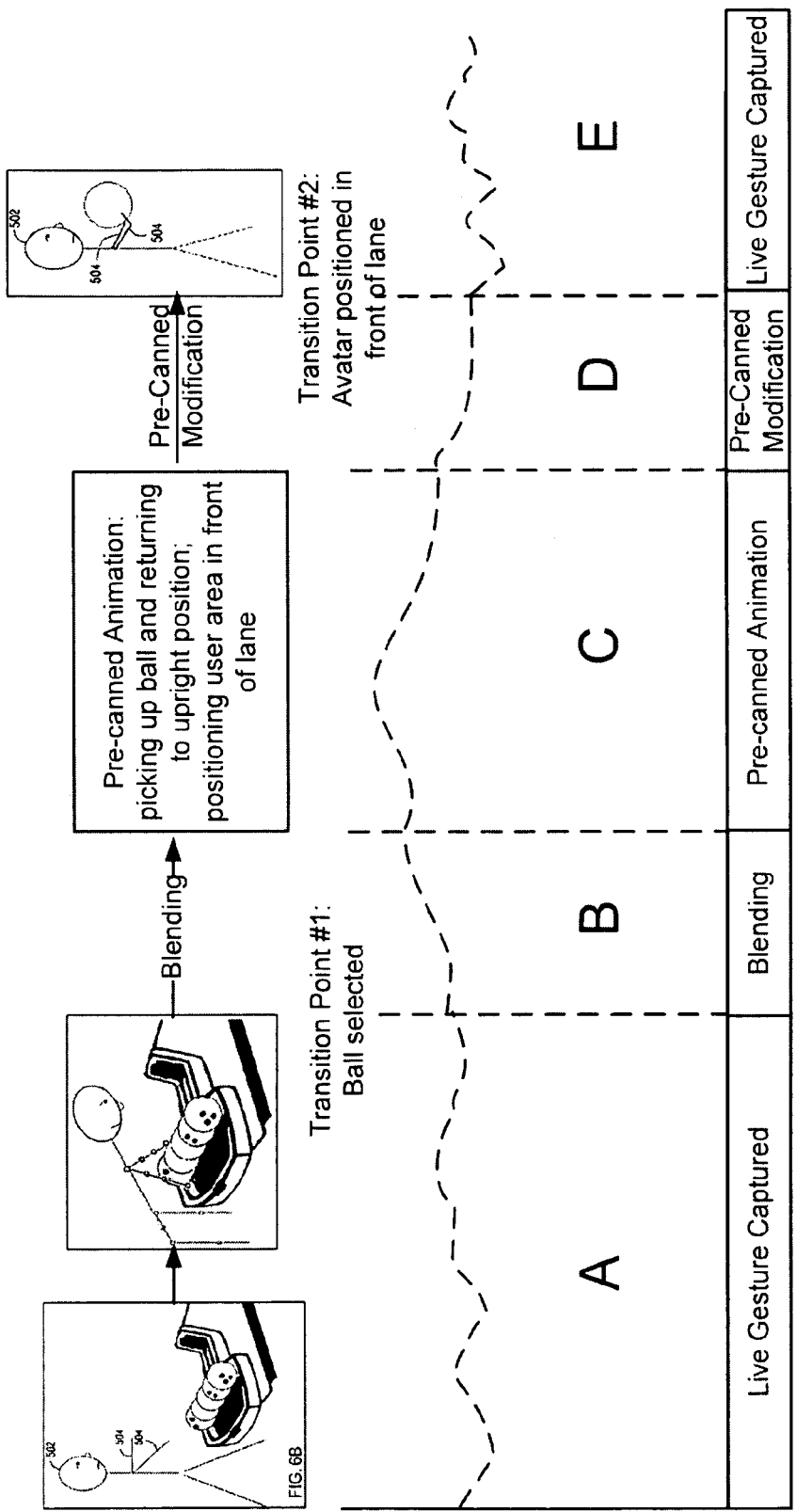

FIGS. 7A and 7B depict each of the frames of user motion depicted in FIGS. 6A-6E, further depicting the sequence of a user's gestures and pre-canned animations, and how a system can chain together animations of the user's gestures and pre-canned animations via animation blending techniques.

The transition points #1, #2, #3, and #4 may be points at which a parameter, for example, a parameter specific to the user's motion, meets the parameters of the transition point. The parameters that identify a transition may correspond to something other than the user's motion, such as a parameter indicative of a certain point in an application. Any suitable method for setting transition points may be employed. The application itself could set the transition points based on the type of application and or the skill level or experience of the user. For example, more pre-canned motions may be implemented for a beginning player. A user could set the transition points so that pre-canned motions are used for particular motions, or the user could request more or less use of pre-canned animations throughout the use of the application.

Meeting the parameters of the transition point can trigger the transition from an animation of a user's motion to a pre-canned animation or the return from a pre-canned animation to a the animation of the user's motion. As shown in FIG. 7A, section A represents the use of an animation of the user's motion, depicting various gestures that control aspects of a bowling game. The implementation of a pre-canned animation may be triggered when the parameters of a transition point are met. The transition at transition point #1 may be triggered by the combination of the application type (e.g., a bowling game), a certain user motion (e.g., bending down), and an application-specific motion (e.g., clutching motion for ball selection).

As shown in section C, an exemplary pre-canned animation in the bowling application may be the motion that involves picking up the ball from the bowling ball return, returning to the upright position, and then positioning the user's avatar, or other visual representation, in front of a bowling lane with bowling pins. In order to make the transition from the captured motion to the pre-canned animation, animation blending may be incorporated as represented by section B and discussed more fully below.

In another example embodiment, the system may pause the displayed representation in the last position provided by the pre-canned animation, such as the last position of the pre-canned animation used in section C. The last position provided by the pre-canned animation may be depicted by the user's representation, such as an avatar, on the display. To resume the representation of live motion made by a user, the user may have to trigger the transition with a particular live gesture. For example, to resume the system's measurement and display of live motion made by the user, the user may have to set up in a position similar to that of the last position provided by the pre-canned animation. Thus, the transition may be broken purposefully to provide a breaking point or assist a player to set themselves into a proper position. A capture of the user's live motion and the detection of a particular motion(s) may trigger the system's return to the use of the user's live motion. As described above, the transition between animations of the user's motion and pre-canned animations may be potentially seamless to a player observing the motion on a display.

A second transition point #2 may be identified by the completion of the motion represented by the pre-canned animation. In an example embodiment, at the transition point #2, the system may return to animating the user's motion. In order to make the transition from the pre-canned animation back to the animation of the user's motions, as represented by Section D, the pre-canned animation used in Section C may be modified to more closely represent the user's position at the beginning of Section E.

The sequence of gestures and animations for the example bowling motion continue as depicted in FIG. 7B. As shown in FIG. 7B, section E again illustrates the system's continued animation of the user's gesture following transition point #2. It may be desirable to display an animation of the user's motion in the physical space after ball selection, as the positioning of the user representation in the game space may be based on user-preference. For example, the user may wish to be close to the lane, or lined up off-center with the bowling pins.

The parameters of a third transition point, transition point #3, may be a user's live motion or a gesture that indicate the user is ready to begin the backswing of the bowling motion. For example, the parameters for transition point #3 may be the identification of a user's gesture that includes holding the ball in a ready position in front of the user's torso, pausing for a predetermined amount of time as an indication that the desired position on the bowling lane has been achieved, and initiating the backswing of the ball from a position in front of the torso towards the user's hip. The system may identify the user's motion that are indicative of transition point #3, thereby triggering the use of the pre-canned animation depicted in section G. As shown in section G, the exemplary pre-canned animation in the bowling application may be the backswing and forward swing motion that occurs behind the plane of the user's hips. The pre-canned animation may be selected from a plurality of pre-canned animations that represent the backswing and forward swing motion. In order to make the transition from the captured motion to the pre-canned animation, animation blending may be incorporated as represented by section F.

A fourth transition point #4 may be identified by the completion of the motion represented by the pre-canned animation. In an example embodiment, at the transition point #4, the system may return to the use of the user's captured motions for representation of user motion. In order to make the transition from the pre-canned animation back to the user's captured motions, animation blending may be incorporated as represented by section H.

The animation of a user's motion may or may not correspond to a control. Likewise, the pre-canned animation may or may not correspond to a control. For example, the animation of the user's motion in the physical space may be mapped to an animation or visual representation of the user, such as an avatar. Where the user's motion does not control an aspect of the application, the system may still display an animation that maps to the user's motion. Likewise, a pre-canned animation may be inserted and displayed that represents a segment of motion, and that motion may or may not be applicable to a control in the application. Alternately, the user's motion may correspond to a gesture that is applicable for control, such as a control for the operating system or in the application. For example, a clutching motion in a bowling game application may represent a ball selection gesture. Likewise, the pre-canned animation may control an aspect of the application (e.g., parameters of the pre-canned animation may be defined that translate into a control of the application when the pre-canned animation is executed).

To chain an animation of the user's gesture or live motion with a pre-canned animation, such as at each of transition points #1, #2, #3, and #4, the system may employ methods of animation blending. Animation blending is the process of taking hierarchical node information from one or more sources and blending them together to generate a new orientation for the nodes of a similar hierarchy. The most typical hierarchy is one which loosely represents the human skeleton. In this hierarchy, each node represents a joint of the skeleton, such as the knee, shoulder or vertebrae. For each node, an orientation containing position, rotation and scale values are typically stored. In this context, animation blending is the process of blending these individual skeletal joint orientations to produce a new skeletal pose from one or more sources.

A variety of existing methods exist to perform the blend of a set of orientations. These can include linear interpolation of the discreet orientation components, spherical linear interpolation on the rotations, continuous spline interpolation, or simple addition, subtraction or modulation of the orientation components. Animation blending quality is highly contextual, so applications may combine or expand on any of the previous methods to achieve the desired result. In addition, the storage method for the data is also highly flexible and may include transformation matrices, discreet position offsets, uniform and non-uniform scale values, and rotations in the form of polar coordinates, axis-angle pairs, quaternion, or discreet Euler angles. As memory use is often a concern for large sets of animated node hierarchies, various compression techniques may be used to quantize or further compact the data described.

Animation blending also includes the process of retargeting. Retargeting is the process of translating one or more dissimilar node hierarchies into a common space for the purposes of blending. As an example, imagine an animated skeletal hierarchy containing motion captured from a professional athlete. As a second source, there might also be a motion captured from an adolescent child. These hierarchies may differ both in the number of joints contained in each skeleton as well as the individual bone lengths each skeleton may contain. To blend them together, one or more of these sources may need to be translated into a common space. This process of retargeting would translate the motion of one skeletal hierarchy into the space or shape of another. In the previous example, the joints of the child may be scaled up to match the proportions of the athlete in order to provide a homogenous set of data to blend.

In addition to the direct blending of animated node hierarchies, there also exists a set of techniques to indirectly blend one or more animations together to produce a result. These can include forward and inverse kinematics. The application of kinematics allows for node orientations to be inferred from a desired target and the surrounding node orientations. For example, given the current location of a shoulder and the desired position of the hand, potential locations for the elbow can be inferred through inverse kinematics. Given that the bone lengths for the upper and lower arm are fixed, there is a finite set of potential orientations for the elbow once the shoulder and hand are positioned. Using human skeletal knowledge and temporal information about the elbow, a suitable location can be chosen. Using this process, orientations can be deduced in cases where nodes are not directly represented in the hierarchies being blended.

Animation blending is represented in FIGS. 7A and 7B as occurring in sections B, and H. Section D represents an example of modifying parameters of the pre-canned modification, as described above, and section F represent an example of selecting a pre-canned animation, out of plurality, that most suits the user's captured motion, also described above. It is noted that any of these options are available for chaining between the animation of the captured motion and the pre-canned animation, in any order. The examples shown in FIGS. 7A and 7B are for exemplary purposes only. For example, modifying the pre-canned animation, shown as occurring in Section D in the transition from a pre-canned motion to a user's motion, could occur in the transition between the animation of captured motion to that of a pre-canned animation.

Animation blending may be any suitable method for smoothing the transition between the animation of the user's live motion or a gesture and the pre-canned animation. For example, the animation blending technique may include interpolating between positions or using single-axis or multi-axis continuous blending. One of the inputs to the animation blending technique may be the user's gesture which is based on user motion in a three-dimensional space. The other input to the animation blending technique may be a position provided by the pre-canned animation If the gesture at the transition point is stationary or involves slight motion, less blending may be necessary. For example, at transition point #1, the user's captured motions that may be identified as a transition point in the bowling application are the user's motion of bending at the waist and making a clutching motion over a ball of choice. Because the gestures indicative of the transition point are controlled motions with slight motion, the amount of animation blending from the user's captured motion in section A to the pre-canned animation in section C may be small. This is represented by a small differential in the graph of motion between section A and section C. The blending in section B to transition the motion in section A to the pre-canned animation in section C thus requires a small amount of animation blending.

In other cases, the motion by the user at the transition point is large or the motion may be varied so much between users or applications, that more blending is required to transition between a live motion and a pre-canned animation. If the transition point is at a point of a lot of motion by the user, additional blending may be necessary for the seamless transition to a pre-canned motion. At the transition point, the more varied a position of the user's motion in the physical space from the starting position of the pre-canned animation, the more blending may be required.

For example, as shown in FIG. 7B at transition point #4, the system transitions from a pre-canned backswing and forward swing motion of the bowling ball to the live motion of the user's swing past the plane of the user's hips. At the transition point, an animation of the captured motions, i.e., the user's motion throughout the backswing and forward swing, may vary from the pre-canned animation based on, for example, the velocity of the user's arm, the distance away from the hips, the type of spin in the user's wrist, etc. Thus, the graph of motion in FIG. 7B represents an example of animation blending in section H that requires more animation blending to smooth the transition from the pre-canned animation in section G back to the an animation of the gesture in section I.

The amount of blending employed can be a factor of failure or success. For example, the amount of blending required to chain a captured motion and a pre-canned animation may correspond to a level of success in the application. If the application is a bowling game, the user's captured backswing motion, or the user's motion at the point of transition, may be vastly different from the starting position of the pre-canned animation. This amount of differential between the user's gesture and the pre-canned animation may be interpreted as a failure. A failure could determine the user's resulting throw of the ball down the bowling lane. For example, if the point of transition in the pre-canned animation back to the an animation of captured motion is a position that largely differs from the user's actual position in the physical space, the ball may not be thrown straight down the bowling lane or the ball may not be aligned with the bowling pins. Or for instance, if a user falls down in the physical space while releasing the bowling ball or, for example, attempts to throw it overhand, the difference between the captured motion and parameters of the pre-canned animation may be evident by the user's success or failure in the game or application.

The motions or poses that a user makes to convey a gesture may change over time, and this may create a change in context. For instance, the user may become fatigued and no longer jump as high as he did at the start of his session to convey a jump gesture. Also, the user may through practice become better at making the motion or pose associated with a gesture, so the acceptable variations for a parameter may be decreased so that two different gestures are less likely to be recognized by one set of motions or pose. The application may also wish to give the user a more challenging experience as he becomes more adroit, so as not to lose his attention. In another embodiment, the application may give the user finer control over the gestures or more gestures to use. For instance, a beginner at a tennis video game may only be concerned with hitting the ball over the net, and not with putting any spin on it. However, as the tennis application detects that the user is improving, it may introduce or recognize gestures for top-spin or back-spin in addition to the standard hit.

Similarly, the parameters associated with transition points for an application may change over time, may vary based on the context, or may be selected based on predictions of user intent. For instance, for the beginner at a tennis video game, more pre-canned animations may be desirable if the beginner is only concerned with hitting the ball over the net. Thus, the transition points may be set accordingly. As the tennis application detects that the user's motion is improving, it may modify the transition points such that less pre-canned animations are inserted.

Gesture history, including joint position, velocity, acceleration, and the like can be used to determine user intent. These factors may seed the parameters for subsequent animations, game controls, and transition points, and determine the pre-canned animation to initiate. For example, in the bowling motion, if the history of that user's backswing and forward swing motion typically is within a certain velocity range, a pre-canned animation with parameters for a motion in accordance with a similar velocity may be selected for that user for blending with the user's captured motion.

A second user may replace the first user as the one providing input and the second user may have drastically different ways of conveying gestures. In an embodiment, the received depth images may be parsed to determine that a second user is in the scene conveying the gestures. Thus, the transition points associated with the second user may be different than the transition points associated with the first user.

Typically, an animation blending operation comprises the taking of two or more inputs and generating a smooth output. Various techniques for animation blending may be employed to chain the animation of the user's motion and one or more authored animations in serial or parallel configurations. These techniques include additive and subtractive blending, linear interpolation, spherical linear interpolation, phase-shifting, linear blending, dissolving, bi-linear blending, combine blending, mirror blending, clamp blending, multi-track blending, layering, etc. For example, layering is when two animations are run simultaneously and the result is a combination of them. Animation blending may involve creating frames between frames of the animation of the user's captured motion or a gesture and the pre-canned animation. Different animations create these in-between frames in different ways. For example, point positions can be interpolated using linear or spline interpolation.

A basic animation blending operation may involve linear interpolation. The transition between a walking gesture animation and a pre-canned running animation may involve blending the end of the measured walking gesture animation parameters into the beginning of the pre-canned running animation parameters. The operation may comprise computing the difference in positions between the two animations and employing linear interpolation to represent the movement that would occur between the two positions. The display of interpolated movement between the animation of the user's captured motion and the pre-canned animation may provide a seamless or almost seamless transition between animations. The duration of the transition may be a function of the acceleration and velocity variables that are measured from the user's captured motion in the physical space, which are used for smoothing the transition from the animation of the walking gesture to the pre-canned running animation.

Still considering the walk to the pre-canned run example, if the delta between the end of the walking gesture animation parameters into the beginning of the pre-canned running animation parameters are small, a simple dissolve technique for animation blending may be sufficient. If the transition is reasonably quick, dissolving from the last position of the walking gesture into the beginning of the pre-canned running gesture may be sufficient. In other cases, it may be desired to sustain a transitional state over a longer duration, creating a few strides of a jogging motion between the pre-canned walk and run animations in order to bridge the gap in their respective locomotion speeds. Traditional animation blending techniques would be employed to generate the jogging motion from one or more pre-canned walk and run animations.

However, often the delta between the captured motion and the pre-canned animation will be offset due to the variable user motion. Thus, the walk and the run may not be in phase, and so blending will simulate a motion that blends or chains the two animations together. An offset between the two animations may be determined, including offsets in position, velocity, and the like. The pre-canned animation may be selected based on the parameters of the user's gesture at the transition point. Also, the parameters of the pre-canned animation may be adjusted to synch to the parameters of the user's live motion. If the desired pre-canned animation is a fast run and the captured motion is a slow walk, more frames of motion may be inserted to represent the transition from the captured motion to the pre-canned animation.

In some cases, it may be desirable to allow a user's observed animation to guide the blend between a set of pre-canned animations. In this way, the user's physical actions become the input parameters guiding the blending technique. For example, an application may contain a variety of professionally authored or motion-captured tennis swing animations. In this palette of swing animations, each may be classified by any number of parameters such as the speed of the swing and the arc of the wrists through space. When the user is observed performing a tennis swing gesture, a corresponding set of parameters about their action in physical space can also be observed. Using the user's observed parameters as a guide, one or more of the pre-canned animations can then be chosen and blended to produce a professional-looking tennis swing which best mimics the users observed action. Such a blend could occur in real-time as the user performs their own swing, continually adjusting the blend parameters between the pre-canned animations. This continual adjustment can be employed to minimize any perceived delay between the user's physical motion and the corresponding actions of the avatar in game space.

Different tools are used to describe the animations at the points of transition and throughout the frames for display. Some methods may use point positions of a 3D skeletal model of the user to define the user's motion or gesture. Other methods use matrices or Euler angles to describe positions of the user's motion/gesture and/or the pre-canned animation.

Auxiliary data or control parameters may also be taken as input to assist the smoothing algorithms, including parameters specific to the pre-canned animation and/or the animation of the user's motion. For example, transition points indicate a reference point for initiating the transition from one animation to the next. A duration of blending may indicate the length of the blend in frames. The blend type may be an indication of how smooth should be the chaining between the pre-canned animation and/or the animation of the user's motion. Other parameters, although not an inclusive list, may be the degree of motion of the animation, the speed of various points of reference (e.g., joints or limbs), the delta between the animation of the user's motion and the pre-canned animation, etc. Using the transition points and parameters related to the animation of the user's motion and pre-canned animation to be chained, animation blending makes it possible to smoothly blend the animations.

Figure 8:
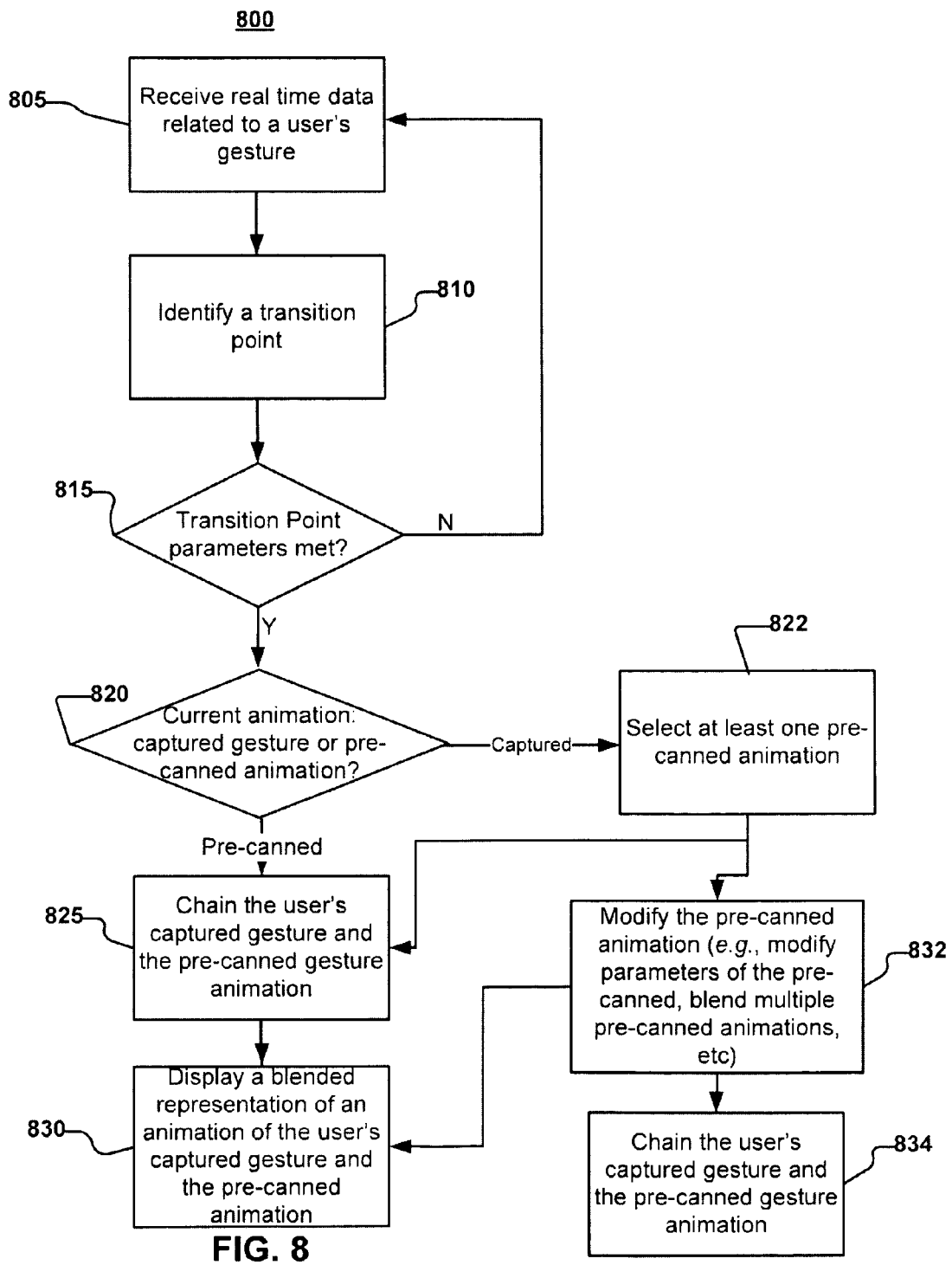
FIG. 8 illustrates an example flow diagram for using pre-canned animation and blending the pre-canned animation with an animation of captured motion

FIG. 8 depicts a flow diagram of an example method 500 for animation blending. The example method 500 may be implemented using, for example, the capture device 20 and/or the computing environment 12 of the target recognition, analysis, and tracking system 10 described with respect to FIGS. 1A-B. According to an example embodiment, the target may be a human target, a human target with an object, two or more human targets, or the like that may be scanned to generate a model such as a skeletal model, a mesh human model, or any other suitable representation thereof. The model may then be used to interact with an application that may be executed by the computing environment 12 described above with respect to FIGS. 1A-1B. According to an example embodiment, the target may be scanned to generate the model when an application may be started or launched on, for example, the computing environment 12 and/or periodically during execution of the application on, for example, the computing environment 12.

For example, as described above, the target may include the user 18 described above with respect to FIGS. 1A-1B. The target may be scanned to generate a skeletal model of, for example, the user 18 that may be tracked such that physical movements or motions of the user 18 may act as a real-time user interface that adjusts and/or controls parameters of an application such as an electronic game. For example, the tracked motions of a user may be used to move an on-screen character or avatar in an electronic role-playing game; to control an on-screen vehicle in an electronic racing game; to control the building or organization of objects in a virtual environment; or to perform any other suitable controls of an application.

According to one embodiment, at 805, a computer-controlled camera system, for example, may measure depth information related to a user's gesture. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain depth information associated with the one or more targets in the scene using any suitable technique such as time-of-flight analysis, structured light analysis, stereo vision analysis, or the like. Further, the depth information may be pre-processed, either as a depth image generated from depth data and color data, or even parsed depth image data, such as having skeletal mapping of any user in the image.

According to an example embodiment, the depth information may include a depth image. The depth image may be a plurality of observed pixels where each observed pixel has an observed depth value. For example, the depth image may include a two-dimensional (2-D) pixel area of the captured scene where each pixel in the 2-D pixel area may represent a depth value such as a length or distance in, for example, centimeters, millimeters, or the like of an object in the captured scene from the capture device.

At 810, the system may identify transition points and the parameters that, when satisfied, are indicative of a transition point. A transition point may be the identifying point in a gesture or between gestures where the system transitions between the animation of captured motion or a user's gesture and a pre-canned animation. In an example embodiment, the transition point may be an identifying point in a gesture or between gestures that provides an indication to switch to a pre-canned animation. Identifying the transition point may comprise determining that the user has moved in such a way as to meet any requirements of a transition point (such as the hand being above the head). In an embodiment, the user can use the voice to make, augment, distinguish or clarify motion. For instance, a user may be able to make a singing gesture by opening and closing his mouth, but also specify a specific note of that singing gesture by singing that note. Additionally, the user may be able to make a "strong punch" gesture as opposed to a "regular punch" gesture by shouting while making the otherwise "regular punch" gesture. In another example embodiment, a transition point is the identifying point in a pre-canned animation that triggers the return to an animation of the captured motion.

At 815, a determination of whether or not transition point parameters are met is made, based on a comparison of parameters of the captured motion or the pre-canned animation (depending on which is currently utilized) to the parameters defined for a particular transition point. If the parameters of a transition are not met, the measuring of depth information continues at 805.

If the parameters of a transition point are met at 815, operation 820 determines whether or not the current animation is based on captured motion or is a pre-canned animation. If a pre-canned animation is currently executing, an animation of the user's captured motion is chained to the pre-canned animation, such as via animation blending techniques. If the current animation is a based on captured motion, the transition point indicates that a pre-canned animation should be selected.

At 822, the system selects at least one pre-canned animation. Many pre-canned animations may represent the same desired motion, and the computing environment may choose a pre-canned animation from the plurality that is most suitable. For example, a plurality pre-canned animation options may be available to represent the backswing of a tennis serve. The position and velocity parameters of the backswing motion may vary for each of the plurality of pre-canned animations that represent the backswing. The system may select the pre-canned animation with parameters most similar to the user's captured motion at the transition point.

If more than one pre-canned animation is selected at 822, the multiple pre-canned animations may be combined in some manner to generate a new pre-canned animation that is desired for chaining to the animation of the user's captured motion. For example, at 832, multiple pre-canned animations may be blended for chaining to an animation of the user's captured motion at 834.

At 832, the parameters of the at least one selected pre-canned animation may be modified. In some cases, the pre-canned animation may be modified to such a point that little or no smoothing is required to chain the pre-canned animation and the animation of captured motion at 834. For example, parameters of the user's captured motion may be analyzed, and a pre-canned animation may be selected for chaining. Prior to chaining, the pre-canned animation may be modified to more closely represent the user's captured motion at the transition point. For example, the position of an arm in the animation may be modified to more closely represent that of the user's captured motion.

Following the selection of the at least one pre-canned animation at 822, at 825, an animation of the user's captured motion and the pre-canned animation are chained. At 830, a display of the blended representation of the user's motion and the pre-canned animation is provided Thus, the system may select or modify a pre-canned animation to be chained to an animation of the user's captured gesture, the system may select a pre-canned animation and then smooth the transition between animations, such as via blending techniques, or the system may do a combination of both. The selection of a pre-canned animation may be from a single option, selected based on the motion provided by the pre-canned animation, or the pre-canned animation may be selected from a plurality of pre-canned animations that each represent a desired motion for animation.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for chaining animations, the method comprising:
    receiving image data that is representative of captured motion;
    selecting a pre-canned animation;
    identifying at least one parameter that is indicative of a transition point in the image data, wherein determining that the image data satisfies the at least one parameter triggers chaining an animation of the captured motion and the pre-canned animation;
    modifying a position in the pre-canned animation using history data associated with a user by making the pre-canned animation more closely represent the user's captured motion at the transition point; and
    chaining the animation of the captured motion and the pre-canned animation by at least displaying the captured motion and the pre-canned animation in sequence.

2. The method in accordance with claim 1, wherein chaining the animation of the captured motion and the pre-canned animation comprises blending the animation of the captured motion to the pre-canned animation or blending the pre-canned animation to the animation of the captured motion.

3. The method in accordance with claim 2, wherein selecting a pre-canned animation comprises selecting a pre-canned animation from a plurality of pre-canned animations.

4. The method in accordance with claim 2, wherein chaining the animation of the captured motion and the pre-canned animation comprises blending parameters of the captured motion to at least one of initial parameters of the pre-canned animation or ending parameters of the pre-canned animation.

5. The method in accordance with claim 1, further comprising selecting multiple pre-canned animations and blending the multiple pre-canned animations to generate a new pre-canned animation, and selecting the new pre-canned animation for chaining with the animation of the captured motion.

6. The method in accordance with claim 1, wherein at least one parameter that is indicative of the transition point is set based on at least one of an application type, a gesture history, a gesture difficulty, a gesture redundancy, an environment context, a skill level or a cultural context.

7. The method in accordance with claim 1, wherein an amount of blending used to blend the animation of the captured motion to the pre-canned animation corresponds to a level of success in an application.

8. The method in accordance with claim 1, further comprising predicting an intent of the captured motion, wherein the pre-canned animation is selected based on a predicted intent.

9. The method in accordance with claim 1, wherein the captured motion is live motion of a target in a physical space.

10. A method for chaining animations, the method comprising:
    receiving image data that is representative of a gesture;
    selecting a pre-canned animation;
    identifying at least one parameter that is indicative of a transition point in the image data, wherein determining that the image data satisfies the at least one parameter triggers chaining of an animation of the gesture and the pre-canned animation;
    modifying a position in the pre-canned animation using history data associated with a user by making the pre-canned animation more closely represent the user's captured motion at the transition point; and
    chaining the animation of the gesture and the pre-canned animation by at least displaying the gesture and the pre-canned animation in sequence.

11. The method in accordance with claim 10, wherein the gesture is a gesture applicable to a game.

12. The method in accordance with claim 10, wherein selecting a pre-canned animation comprises selecting a pre-canned animation from a plurality of pre-canned animations.

13. The method in accordance with claim 10, further comprising selecting multiple pre-canned animations and blending the multiple pre-canned animations to generate a new pre-canned animation, and selecting the new pre-canned animation for chaining with the animation of the gesture.

14. The method in accordance with claim 10, wherein chaining the animation of the gesture and the pre-canned animation comprises chaining the animation of the gesture to the pre-canned animation or chaining the pre-canned animation to the animation of the gesture.

15. The method in accordance with claim 10, wherein chaining the animation of the gesture and the pre-canned animation comprises chaining parameters of the gesture at the transition point to at least one of initial parameters of the pre-canned animation or ending parameters of the pre-canned animation.

16. The method in accordance with claim 10, wherein at least one parameter that is indicative of the transition point is set based on at least one of an application type, a gesture history, a gesture difficulty, a gesture redundancy, an environment context, a skill level or a cultural context.

17. The method in accordance with claim 10, wherein an amount of blending required to chain the animation of the gesture and the pre-canned animation corresponds to a level of success in an application.

18. The method in accordance with claim 10, further comprising predicting an intent of the gesture, wherein the pre-canned animation is selected based on a predicted intent.

19. A system for animation blending, the system comprising:
    a capture device component, wherein the capture device component is configured to receive image data that is representative of captured motion;

a processor, wherein the processor is operable to execute computer executable instructions, and wherein the computer executable instructions comprise instructions for:

selecting a pre-canned animation;

identifying at least one parameter that is indicative of a transition point in the image data, wherein determining that the image data satisfies the at least one parameter triggers blending of an animation of the captured motion to the pre-canned animation;

modifying a position in the pre-canned animation using history data associated with a user by making the pre-canned animation more closely represent the user's captured motion at the transition point; and at the transition point, displaying the animation of the captured motion and the pre-canned animation in sequence.

20. The system in accordance with claim 19, wherein displaying the animation of the captured motion and the pre-canned animation comprises blending the animation of the captured motion to the pre-canned animation or blending the pre-canned animation to the animation of the captured motion.

21. The system in accordance with claim 19, further comprising a display device for displaying a blended animation of the captured motion and the pre-canned animation.

22. The system in accordance with claim 19, wherein the captured motion is live motion of a target in a physical space captured by the capture device.

\* \* \* \* \*